United States Patent [19]

Koenig

[11] Patent Number: 4,607,201

[45] Date of Patent: Aug. 19, 1986

[54] APPARATUS FOR IMPROVING THE LONGITUDINAL OR PITCHING STABILITY OF AIRCRAFT

[75] Inventor: Herbert Koenig, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 769,875

[22] Filed: Aug. 27, 1985

[30] Foreign Application Priority Data

Aug. 28, 1984 [DE] Fed. Rep. of Germany ....... 3431597

[51] Int. Cl.$^4$ ............................................. B64C 13/18
[52] U.S. Cl. .................................... 318/584; 318/586; 318/616; 244/181
[58] Field of Search ............... 318/584, 585, 586, 580, 318/611, 615, 616, 617; 244/181, 220, 221, 225, 228

[56] References Cited

U.S. PATENT DOCUMENTS

| 4,094,479 | 6/1978 | Kennedy | 318/586 X |
| 4,171,115 | 10/1979 | Osder | 318/181 |
| 4,304,375 | 12/1981 | Builta et al. | 318/584 X |
| 4,345,195 | 8/1982 | Griffith et al. | 318/586 |
| 4,463,297 | 7/1984 | Bennett et al. | 318/584 X |

FOREIGN PATENT DOCUMENTS 3947 2/1983 European Pat. Off. .

Primary Examiner—B. Dobeck
Attorney, Agent, or Firm—W. G. Fasse; D. H. Kane, Jr.

[57] ABSTRACT

The control of the longitudinal or pitching stability of aircraft is improved by providing a corrected control characteristic for the correction adjustment drive which is interposed between the pilot operated control stick and the main control drive, for example for the blade angle adjustment in a helicopter or for the elevator adjustment in fixed wing aircraft. A control linkage (2) is connected on one end to a main control drive (4) for the elevator or rotor blade adjustment and at its other end to the control stick (1). The correction adjustment drive (3) is interposed in the control linkage (2). A displacement pickup (5) measures the control displacement of the control linkage (2) and a flight speed pickup (6) measures the flight speed. To improve the control of the longitudinal or pitching stability without having the corrected control displacements of the control stick (1) become too large, a delay circuit (7) and first differentiating circuit (8) are serially connected downstream of the displacement pickup (5). A second differentiating circuit (9) and a linear amplifier (10) are serially connected downstream of the flight speed pickup (6). A first summing circuit (11) subtracts the output signal of the amplifier (10) from that of the first differentiating element (8). An integrator (13) connected with its output to the correction adjustment drive (3) is connected with its input through a switch (12) to the summing circuit (11). A logic circuit (14) controls a switch (12) so that the switch (12) is closed as soon as the gradient of the function $D_T(v)$, where $D_T$ is the output signal of the delay circuit (7) and v is the flight speed, falls below the amplification factor G of the amplifier (10).

4 Claims, 6 Drawing Figures

APPARATUS FOR IMPROVING THE LONGITUDINAL OR PITCHING STABILITY OF AIRCRAFT

FIELD OF THE INVENTION

The invention relates to an apparatus or device for improving the control of longitudinal or pitching stability of aircraft, especially of helicopters.

DESCRIPTION OF THE PRIOR ART

Such devices include a control linkage operatively connected at one end to a main control drive for the adjustment of the elevators or rotor blades. The other end of the control linkage is connected to a control stick arranged for cooperation with the main control drive. A correction control drive is interposed in the control linkage for lengthening or extending the control linkage in a controlled manner. A displacement pickup is provided for measuring the control displacement between the correction control drive and the main control drive. A flight speed pickup or sensor measures the flight speed.

In aircraft, especially helicopters, in which the forward speed is controlled by appropriate adjustments of the elevators or rotor blades by the aid of a control stick, it is required that the control displacement of the control stick increases as the flight speed increases. The control stick is operatively connected with the main control drive for the elevator or rotor blade adjustment by means of the above mentioned control linkage. As a result of the aerodynamic characteristics, especially of helicopters, the functional dependence of the control displacement on the flight speed still, however, always exhibits a maximum. When this maximum is exceeded, the control displacement begins to decrease, as the flight speed continues to increase. Measures have been taken to match the control displacement of the control stick to the desired functional relationship, because this decrease in the control displacement after the maximum is exceeded, causes substantial piloting difficulties for the pilot.

Therefore, a correction control drive has been interposed in the control linkage for extending the control linkage in a controlled manner as described in the EP-PS No. 0,003,947. With a proper control of the correction control drive such a device permits that the control displacement of the control stick keeps increasing as the flight speed increases even after the critical flight speed has been exceeded, at which speed the gradient of the control displacement as a function of the flight speed would become negative without corrective measures. This known device is provided with a displacement pickup for measuring the control displacement of the control linkage between the correction adjustment drive and the main control drive. The output signal of this displacement pickup is added to a further control signal and then amplified. The amplified signal is directly supplied to the correction control drive. The further control signal is generated in a complicated manner from a flight speed signal obtained from a flight speed sensor and from a position signal produced by a position sensor for a collective lever. Therefore a total of three measured values are required to control the correction control drive. These three measured values are provided by the displacement pickup, the flight speed sensor, and the position sensor of the collective lever. The processing of these three measured values requires a circuit that is relatively complicated and therefore expensive. Additionally, the circuit is susceptible to disturbances or trouble-prone. Furthermore, this known method of generating the control signal for the correction control drive leads to disproportionately large corrections of the control displacement of the control stick. However, this is not always desired for spacial reasons having regard to the limited available space.

OBJECTS OF THE INVENTION

In view of the above it is the aim of the invention to achieve the following objects singly or in combination:
to provide a device, as described above, which improves the control of the longitudinal or pitching stability in a simple manner and with relatively simple circuits; and
to make sure that the corrected control displacements of the control stick do not become too large.

SUMMARY OF THE INVENTION

These objects are achieved according to the invention by the combination of the following features. A delay circuit receives the output signal of a displacement pickup, a first differentiating circuit is connected in series between the output of the delay circuit and a signal summing circuit. A second differentiating circuit receiving the output signal of a flight speed pickup is connected to a linear amplifier serially downstream of the second differentiating circuit. The linear amplifier in turn is connected to said summing circuit which subtracts the output signal of the amplifier from the signal of the first differentiating circuit. An integrating circuit is serially connected between the summing circuit and the correction control drive through a switch interposed between the summing circuit and the integrating circuit. A controlling logic circuit closes the switch as soon as the gradient of the function $D_T(v)$, where $D_T=$ the delayed control displacement signal at the output of the delay circuit and $v=$ flight speed, falls below a specifiable limit value which is identical to the amplification factor of the linear amplifier. This circuit arrangement is substantially simpler than the above described prior art.

According to an advantageous further embodiment of the invention, the logic circuit comprises the following elements. A first multiplier for receiving the output signals from the first and second differentiating circuits. A second multiplier for receiving the output signals from the second differentiating circuit and from the linear amplifier. A further summing circuit for subtracting the product signal of the second multiplier from the product signal of the first multiplier. A switching logic circuit for closing the above mentioned switch in case of a negative summation signal from the further summing circuit. Furthermore, it can be advantageous to serially connect an amplifier, especially one with an amplification factor of $K \leq 1$ in series with the integrator between the integrator and the correction adjustment drive.

BRIEF DESCRIPTION OF THE DRAWINGS

In order that the invention may be clearly understood, it will now be described, by way of example, with reference to the accompanying drawings, wherein:

FIG. 1b shows the differentiation of the curve of FIG. 1a;

DETAILED DESCRIPTION OF PREFERRED EXAMPLE EMBODIMENTS AND OF THE BEST MODE OF THE INVENTION

Figure 1A:
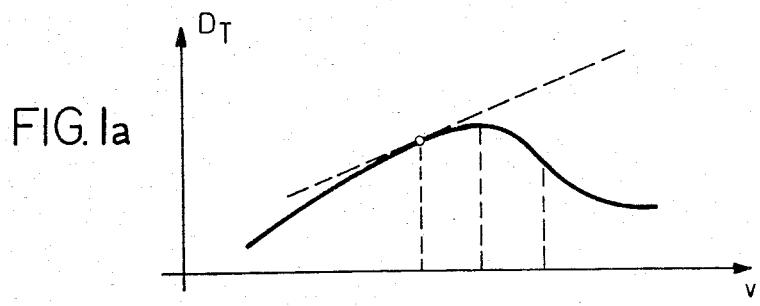
FIG. 1a shows the control displacement $D_T$ of the control stick as a function of the flight speed without any correction of the control displacement.
Figure 1B:
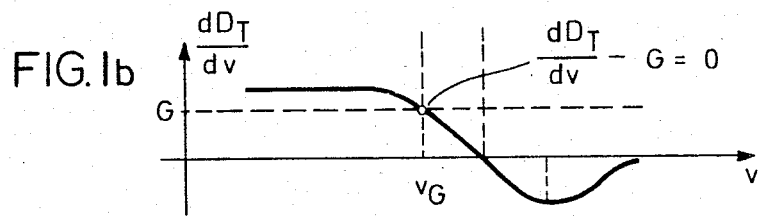

The full line curve of FIG. 1a shows the dependence of the control displacement $D_T$ of the control stick from the flight speed v if no correction control drive is provided. The full line curve $D_T(v)$ first increases with the flight speed v, passes through a maximum, and thereafter decreases. This shape of the curve is a direct result of the uncorrectable flight characteristics of a helicopter. However, it is desired that the control displacement $D_T$ of the control stick should increase continuously as the flight speed increases to avoid orientation difficulties that the pilot may have in determining the direction required for control movements. Such a desired curve shape $D_T(v)$ achieved according to the invention is represented by the solid curve in FIG. 1d. FIG. 1b shows the shape of the slope $dD_T/dv$ derived by differentiating the curve $D_T(v)$ of FIG. 1a, whereby the maximum of the curve $D_T(v)$ of FIG. 1a lies at a point of the zero passage of the slope curve or rather gradient curve.

According to the requirement to achieve a continuously positive slope of the curve $D_T(v)$, the gradient curve $dD_T/dv$ cannot fall below a specifiable, positive limit value G. Therefore, a correction must be made when such a limiting speed $v_G$ is reached. The condition for this correction range is therefore:

$$\frac{dD_T}{dv} = \frac{dD_T}{dt} \cdot \frac{dt}{dv} = \frac{\dot{D}_T}{\dot{v}} < G \quad (1)$$

or $$\frac{dD_T}{dv} - G = \frac{\dot{D}_T}{\dot{v}} - G < 0 \quad (2)$$

According to the invention, a control signal $\Delta D_T$ is generated from (1) and (2) by integration, thus:

$$\Delta D_T = \int \left( \frac{dD_T}{dv} - G \right) dv = \int (\dot{D}_T - G\dot{v}) dt \quad (3)$$

Figure 2:
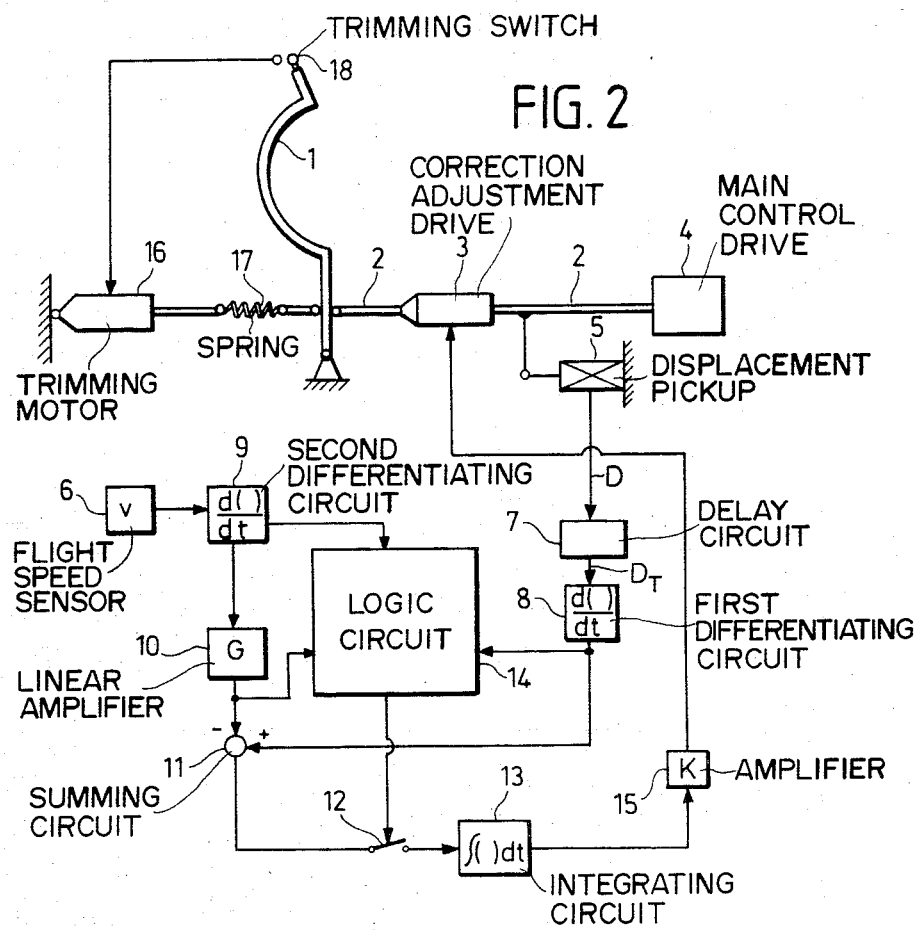
FIG. 2 shows a circuit diagram for improving the control of the longitudinal or pitching stability of a helicopter, according to the invention.

This control signal $\Delta D_T$ is used to control the correction control drive 3 shown in FIG. 2.

This control signal $\Delta D_T$ is transmitted to the correction control drive only if condition (2) is satisfied. To avoid the occurrence of a nominator value in the fraction that can become zero, the condition (2) is multiplied by the factor $v^2$, which can never be negative, so that the following new condition results:

$$\dot{D}_T\dot{v} - G\dot{v}^2 < 0 \quad (4).$$

However, the condition (2) may also be modified by other means, for example by multiplication with non-negative factors without affecting the core or basic concept of the condition.

Figure 1C:
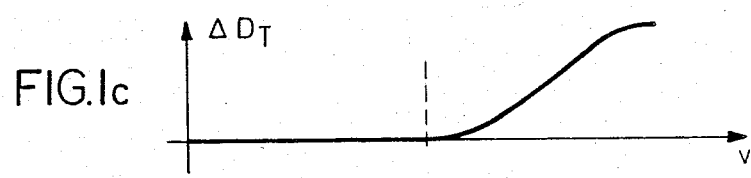
FIG. 1c shows the control signal for the correction adjustment drive according to the invention.
Figure 1D:
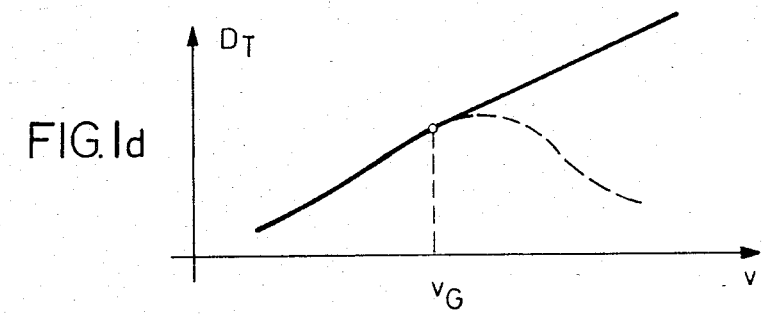
FIG. 1d shows by the full line the corrected control displacement according to the invention and by the dashed line the conventional control stick displacement.

The control signal $\Delta D_T$, generated by integration as described above, actuates a control displacement correction in accordance with the curve shown in FIG. 1c. The shape of the curve shown in FIG. 1d results from the addition of the curves $D_T(v)$ of FIGS. 1a and 1c. This curve in FIG. 1d represents the control displacement of the control stick, whereas FIG. 1c represents only that part of the control displacement which is actuated or caused by the correction drive.

FIG. 2 shows a specific embodiment of the device according to the invention for a helicopter. A control stick 1 is operatively connected to the main control drive 4 for the rotor blade angle adjustment, by means of a control linkage 2. A spring-pack 17 connects the control stick 1, preferably opposite to the control linkage 2 to a trimming motor 16 for conventionally trimming the control stick 1 in response to a signal from a trimming switch 18 connected to the control stick 1 and to the trimming motor 16. This trimming of the control stick 1 means that it is held free of forces during stable flight conditions or attitudes.

A correction control or correction adjustment drive 3 is interposed in the control linkage 2. The control linkage 2 can be extended or lengthened by bringing the correction control drive 3 out of its retracted position. A displacement pickup 5 measures the control displacement of the control linkage 2 at a point between the correction control drive 3 and the main control drive 4.

The control displacement measured by the displacement pickup 5 corresponds exactly to the full line curve in FIG. 1a, that is, the control displacement that is actually transmitted from the control stick 1 to the main control drive 4 of the rotor. If the correction control drive 3 were not provided, the control displacement of the control stick 1 would always exactly match the control displacement measured by the displacement pickup 5. According to the curve in FIG. 1a, the control stick 1 would have to be pulled back with further increases in speed above the critical speed $v_G$. However, this pull back is avoided or even over-compensated by means of the properly controlled correction control drive 3 so that the control stick 1 can be further displaced in the same direction, that is in the forward direction, while the correction control drive 3 of FIG. 2 causes an extension of the control linkage 2 to the right, whereby a displacement movement reversal of the control linkage 2 between the correction control drive 3 and the main control drive 4 is provided, relative to the range $v < v_G$.

To achieve such an effect with the aid of the correction adjustment or correction control drive 3, the following circuit features are provided according to the invention. A displacement pickup 5 continuously provides a signal corresponding to the control displacement D of the control linkage 2 leading to the main control drive 4. This displacement signal D is fed to a signal delay circuit 7, for example with a time constant T. The output signal $D_T$ of the signal delay circuit 7 is then differentiated in a first differentiating circuit 8 providing an output signal $\dot{D}_T$ to one input of a first signal summing or combining circuit 11. Further, a flight speed signal is transmitted by a known flight speed pickup or sensor 6, for example a Pitot tube, to a second signal differentiating circuit 9 where the flight speed signal is differentiated. The output signal from the second differentiating circuit is amplified by an amplification factor G in a linear amplifier 10. This amplification factor G is the limiting value in FIG. 1b and in condition (1). It can be adjusted as desired. The output signal of the amplifier 10, corresponding to the product $\dot{v}\cdot G$ is fed to a second input of said first summing circuit 11, which subtracts this signal from the output signal of the first differentiating circuit 8 to provide a feedback signal for the correction control of the correction adjustment drive 3.

The delay circuit 7 should be so constructed, regarding its time constant that it reproduces aproximately the time lag of the helicopter's response to a control command due to its inertia.

In the case of a helicopter, the governing time constant T is in the order of magnitude of about ten seconds. If the delay circuit 7 receives a step function, in the extreme case, from the displacement pickup 5 it causes its output signal $D_T$ to gradually increase and to reach the value of the input signal only after a specific delay dependent upon the time constant T. If the delay circuit 7 is of the first order, for example, then the increase follows an e-function in a known manner.

The difference signal formed between the two signals entering the first summing circuit 11 is fed to an integrator circuit 13. However, this only happens when the switch 12, which is serially connected upstream of the integrator 13, is closed. The closing of the switch 12 is controlled by a logic circuit 14 which only closes the switch 12 when the speed $v_G$ is exceeded in accordance with condition (1). The output signal of the integrator 13 then corresponds to the control signal for the correction control drive 3 given by equation (3). This output signal can additionally be amplified in an amplifier 15, whereby amplification factors $K \leq 1$ are used in practice.

A total of three parameters are available for optimally matching the control characteristic of the present circuit to the desired control curve. These are the time constant T of the delay circuit 7 and the amplification factors G and K of the amplifiers 10 and 15, respectively.

Figure 3:
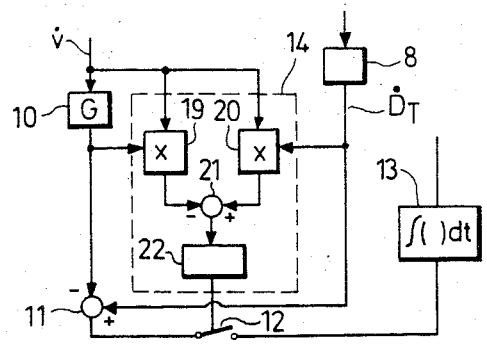
FIG. 3 shows a specific embodiment of a logic circuit for use in the circuit according to FIG. 2.

FIG. 3 shows a possible and especially simple specific embodiment for the logic circuit 14 by means of which condition (4) is realized. The logic circuit 14 comprises essentially two signal multipliers 19 and 20, a second summing circuit 21 for subtracting the output signal of multiplier 19 from that of the multiplier 20 and a switching logic 22 for processing the summation or rather difference signal from this second summing circuit 21 and for closing the switch 12 only when the condition (4) is satisfied. For this purpose, the output signals of the second differentiating circuit 9 and of the amplifier 10 are fed into the multiplier 19 so that the product signal $G\cdot \dot{v}^2$ is provided at its output. The output signals of the first and second differentiating circuits 8 and 9 are fed into the multiplier 20 so that the product signal $\dot{D}_T\cdot\dot{v}$ is provided at its output.

The stabilization is always achieved as desired in accordance with the condition (4) regardless of the specific nature of the cause for the necessity of a control displacement stabilization.

The control range of the correction control drive 3 need be only large enough so that the control displacement gradient of the control stick 1 does not fall below the limiting value G, within the flight speed range of practical interest.

Although the invention has been described with reference to specific example embodiments, it will be appreciated, that it is intended to cover all modifications and equivalents within the scope of the appended claims.

What I claim is:

1. In an apparatus for improving the control of the longitudinal or pitching stability of an aircraft, especially of helicopters, wherein a control linkage is operatively connected at one end to a main control drive (4) for the adjustment of elevator means or of rotor blades, and at the other end to a control stick for said main control drive; wherein a correction adjustment drive is interposed in the control linkage for lengthening the control linkage in a controlled manner; the improvement comprising: displacement pickup means (5) for sensing a control displacement between said correction adjustment drive (3) and said main control drive (4) to provide a displacement representing first signal, flight speed pickup means (6) for sensing the flight speed to provide a speed representing second signal, signal delay means (7) for said first signal from said displacement pickup means (5), first signal differentiating means (8) connected serially to said signal delay means (7) for differentiating the delayed first signal, second differentiating circuit means (9) serially connected to said flight speed pickup means (6) for differentiating said second signal, a linear amplifier (10) serially connected to said second differentiating circuit means (9), first summing circuit means (11) connected for subtracting the output signal of said linear amplifier (10) from the signal provided by said first differentiating circuit means (8), signal integrator circuit means (13), switch means (12) connecting said signal integrator circuit means serially to said first summing circuit means (11), means operatively connecting said correction adjustment drive (3) to said signal integrator circuit means (13), and switch controlling logic circuit means (14) operatively arranged for closing said switch means (12) as soon as a gradient of a function $D_T(v)$, where $D_T$= the delayed control displacement first signal at the output of said delay means, and wherein v = flight speed, falls below a specifiable limiting value which is identical to an amplification factor G of said linear amplifier (10).

2. The apparatus of claim 1, wherein said controlling logic circuit means (14) comprise a first multiplier (20) connected to receive said differentiated first and second signals from the first and second signal differentiating circuit means (8 and 9), a second multiplier (19) connected to receive the output signals from the second differentiating circuit means (9) and from said linear amplifier (10), a second signal summing circuit means (21) connected for subtracting a product signal of said second multiplier (19) from that of said first multiplier (20), and a switching logic circuit means (22) for closing said switch (12) in response to a negative summation signal from said second signal summing circuit means (21).

3. The apparatus of claim 2, further comprising an amplifier (15) connected serially between an output of said signal integrator circuit means (13) and said control adjustment drive (3).

4. The apparatus of claim 1, further comprising an amplifier (15) connected serially between an output of said signal integrator circuit means (13) and said control adjustment drive (3).

* * * * *